United States Patent [19]

Sarich et al.

[11] Patent Number: 4,462,760
[45] Date of Patent: Jul. 31, 1984

[54] METHOD AND APPARATUS FOR METERING LIQUIDS

[75] Inventors: Tony R. Sarich, Karrinyup; Kenneth N. Johnsen, Greenwood; Michael L. McKay, Mosman Park, all of Australia

[73] Assignee: Orbital Engine Company Proprietary Limited, Willeton, Australia

[21] Appl. No.: 281,049

[22] Filed: Jul. 7, 1981

Related U.S. Application Data

[63] Continuation-in-part of Ser. No. 29,054, Apr. 11, 1979, abandoned.

[30] Foreign Application Priority Data

Apr. 14, 1978 [AU] Australia .............................. 45827/79

[51] Int. Cl.³ .............................................. F04F 1/06
[52] U.S. Cl. ..................... 417/54; 123/531; 417/86; 417/145
[58] Field of Search ................ 417/118, 121, 137–145, 417/54, 101, 102, 92, 86, 319, 572, 274, 275; 123/531–535

[56] References Cited

U.S. PATENT DOCUMENTS

| | | | |
|---|---|---|---|
| 638,626 | 12/1899 | Cummings | 417/118 |
| 1,122,770 | 12/1914 | Lake | |
| 2,047,167 | 7/1936 | Heller | 417/274 |
| 2,739,643 | 3/1956 | Voit et al. | 417/274 X |
| 2,761,615 | 9/1956 | Prince | 417/274 X |
| 3,161,144 | 12/1964 | Hugentobler | 417/145 X |
| 3,556,682 | 1/1971 | Sakamoto et al. | 417/102 |
| 3,873,238 | 3/1975 | Elfarr | 417/118 X |
| 3,970,063 | 7/1976 | Mayr et al. | 123/531 X |
| 4,037,992 | 7/1977 | Uchida et al. | 417/102 |
| 4,211,518 | 7/1980 | Kortenbusch | 417/103 X |

FOREIGN PATENT DOCUMENTS

| | | |
|---|---|---|
| 521309 | 7/1921 | France . |
| 2050728 | 4/1971 | France . |

Primary Examiner—Edward K. Look
Attorney, Agent, or Firm—Murray, Whisenhunt and Ferguson

[57] ABSTRACT

A method and apparatus for delivering metered quantities of liquid wherein the liquid is circulated through a chamber to fill the chamber with liquid and circulation is temporarily terminated with the chamber filled with liquid. While circulation is terminated gas under pressure is admitted to the chamber to displace liquid therefrom through a discharge port. The quantity of liquid displaced is controlled by regulating the volume of the chamber and/or by regulating the relative disposition in the chamber of the point of entry of the gas and point of discharge of the liquid.

60 Claims, 6 Drawing Figures

METHOD AND APPARATUS FOR METERING LIQUIDS

This is a continuation-in-part of application Ser. No. 29,054, filed Apr. 11, 1979 now abandoned.

BACKGROUND OF THE INVENTION

This invention relates to a method and apparatus for metering the delivery of liquids, particularly in small quantities and at high rates. The invention is particularly applicable to the metering of fuel to an internal combustion engine, however it will be readily appreciated that there are other applications for the invention. Examples of other applications are the metering of additives or reaction agents in industrial processes, such as chemical processes. However, for convenience, the invention will now be specifically described and illustrated with reference to its application to metering fuel to an internal combustion engine.

The advantages of metering fuel to an engine by an injection system as compared with a carburation system are well recognised. Because of the improved control over the quantity of fuel delivered to the engine achieved by fuel injection systems, a lower specific fuel consumption is achieved together with an increased power output. Also fuel injection systems result in a lower pollution level in the exhaust gases from the engine and improved starting and acceleration characteristics of the engine.

Although there are known a number of effective fuel injection systems, the carburettor is still the preferred means of metering the fuel to the engine as it is cheaper to manufacture and less expensive to maintain, partly because it is primarily a low pressure device. The high pressure encountered in fuel injection systems require high precision in the sizing and surface finish of many components, particularly in fuel pumps and metering devices, together with high precision and quality in seals between moving parts. In known fuel injection systems the injection is usually achieved by mechanical mechanisms, such as pistons moving in cylinders, and in view of the high pressure required to inject the fuel the forces involved are correspondingly high, and thus absorb significant energy, and require materials and surface treatments to reduce wear.

In view of the relatively high costs of manufacture of known fuel injection systems they are currently not used on the more popular makes of motor vehicles in the high volume low cost category. However, in view of the increasing requirements for low pollution levels in exhaust gases, it would be desirable to incorporate fuel injections systems on all motor vehicles, provided this could be done at a reasonable cost.

In U.S. Pat. No. 3,556,682 granted to Sakamoto et al there is disclosed an apparatus for transferring liquids which operates according to the principle of alternate displacement of liquid in a closed vessel. This apparatus operates on the basic concept of having a closed chamber of a fixed volume with inlet and outlet valves at the lower end for the liquid to be transferred, and inlet and outlet valves, at the upper end for the driving liquid. The transfer liquid is pumped in through the bottom inlet valve whilst the top outlet valve is open, so that the driving liquid in the chamber may be displaced by the incoming transfer liquid. When the chamber has been filled to its total capacity, or to a predetermined level, with the transfer liquid, the transfer liquid inlet valve and the driving liquid outlet valve are closed, and the transfer liquid outlet valve and driving liquid inlet ports are open. Driving liquid is them pumped into the top of the chamber through the driving liquid inlet valve to displace the transfer liquid in the chamber through the transfer liquid outlet valve at the bottom of the chamber.

In the description of the apparatus disclosed in the Sakamoto et al specification with reference to FIG. 1 thereof, no information is given as to how the operation of the valves is controlled. However it does appear that in each cycle the chamber is completely filled with transfer liquid, and then that complete quantity of transfer liquid is discharged by the driving liquid. Accordingly on each cycle the same quantity of liquid is transferred and there is no way in which the quantity of liquid transferred in each cycle can be varied.

In the various other embodiments of the apparatus as described in that prior specification with reference to FIGS. 2 to 16, the same general cylinder and valve arrangement is used as discussed above in connection with FIG. 1. However, there is provided in the cylinder a float which moves up and down in the cylinder on the surface of the transfer liquid and acts in the manner of a floating piston between the transfer and driving liquids. The float carries a peripheral band of magnetic material and two magnetic sensors are located externally of the cylinder, and spaced apart a distance determined by the quantity of liquid to be transferred during each cycle.

As the float reaches the levels of the respective magnetic sensors, the magnetic band on the periphery of the float activates the sensor so that a signal is passed to the mechanism controlling the valves to carry out the appropriate opening and closing of valves.

There is no suggestion in the specification that the quantity of transfer liquid delivered during each cycle can be regulated as the magnetic sensors have a fixed position relative to the chamber. This is not surprising as the apparatus disclosed in the specification is basically a pumping apparatus for the transfer of liquid from one location to another, and is not intended to be a measuring or metering apparatus whereby precisely measured quantities of liquid are delivered during each cycle. The magnetic sensors which detect the position of the float in the chamber are not for the purposes of determining the quantity of liquid transfer of each cycle, but are purely for the purposes of having a means of automatic operation of the valves so that the apparatus can be operated continuously for a large number of cycles without risk of malfunction.

As referred to in the specification, this type of apparatus is primarily used for the pumping of high viscosity liquids, such as slurries of coal or mineral materials, where more conventional pumps cannot be employed.

It is evident that the apparatus disclosed in the Sakamoto et al specification is not intended to be used for the delivery of an accurately measured quantity of liquid each cycle, and there is no indication as to how the quantity of liquid delivered each cycle can be varied in accordance with external demand parameters. It is further evident that as it is intended for the driving fluid to be recycled, there should be no intermixing of the driving liquid and the transfer liquid. Thus, as stated in the specification, the density of the transfer liquid must be substantially greater than that of the driving liquid. Finally it is also evident that the cycle time of the apparatus disclosed in the Sakamoto specification is relatively long, and it could not operate on a cycle time of one second as less as is required in many applications of liquid metering equipment.

There has been proposed in U.S. Pat. No. 3,698,368 a fuel injection system for two-cycle engines, however it is not known that this system has been proved commercially successful. In several embodiments of this system described in the United States patent specification a rigid piston is employed and thus these embodiments exhibit the general disadvantages discussed hereinbefore in connection with known fuel injection systems.

In one embodiment a diaphragm pump is used and the suction stroke of the pump varied in order to meter the quantity of fuel delivered. It is believed that the inherent high flexibility of a diaphragm would operate against the attainment of accurate metering of fuel.

In French Patent No. 521309 there is disclosed a carburettor pump for two-stroke engines wherein there is delivered a charge of air under pressure to the working cylinder of the engine, and a measured quantity of fuel is picked up by the charge of air as the air is travelling to the working cylinder of the engine. Accordingly, the fuel is not truly injected but the fuel is just moved to a position within the stream of air, and that stream of air basically atomizes and/or vaporises the fuel so that it becomes entrained in the stream of air.

As the disclosure in this specification is not related to a true injector system, the fuel will only be subjected to relatively low pressures, particularly as the fuel is not required at any stage to be injected into the working cylinder of the engine against the pressures in the working cylinder. Accordingly, the sealing problems and the fine tolerances which are encountered in normal fuel injection systems would not be present in the system disclosed in this specification.

In addition, the chamber in which the quantity of fuel is measured is required to move into and out of the passage of the air once each revolution of the engine. Accordingly there will be considerable wear over a period of time of the working parts which must lead to fuel leakage and consequently loss of accuracy in the quantity of fuel delivered.

Accordingly, it is seen that the carburettor pump, as disclosed in this French patent, if applied to a high pressure true fuel injection system, would have the same problems as the conventional injector system, that is, the high manufacturing costs and wear associated with manufacturing and operating moving parts at relatively high speed and with high rates of wear, further aggravated by the need to maintain effective seals between the moving components against leakage of fuels subjected to high pressures.

French Patent No. 2050728 discloses a true fuel injection metering arrangement wherein the fuel is displaced from a metering chamber by a gas under high pressure that injects the measured quantity of fuel into the working chamber of the engine. Apart from its high pressure operation, in most other regards, the injection system of this prior specification is very similar to that of French Patent No. 521309. It still requires the chamber that effects the metering of the fuel quantity to be moved between a position in which it receives the fuel to a position at which the fuel is discharged from the chamber by high pressure gas.

The difference between the two French constructions is that in one the member carrying the chamber is subjected to a reciprocating movement, whereas, in the other it is subjected to a rotatory movement. The extent of the movement of the member carrying the chamber in French Patent No. 2050728 is relatively small which is desirable from the point of view of reducing wear, however, it is not a continuous rotary motion but a step-wise motion. The chamber member would, during each cycle, rotate through one-quarter of a revolution with stationary periods at each end of the movement. This type of intermittent movement does of course increase the rate of wear between the mating moving surfaces, and hence the maintaining of an effective seal between the two moving components would still be a major problem.

Another problem with the proposed construction in both the French patents is that in each at least some of the seals between the moving component and the stationary component would be in contact with a surfase that is not a smooth continuous surface which would be most detrimental to the effective life of the seals.

It is seen that the construction disclosed in both the French patents uses a chamber formed in a movable member that must go through one cycle of movement for each delivery of fuel. The French constructions therefore basically have the same problems as always exist where it is endeavoured to contain the measured quantity of fuel in a chamber formed in or by a movable member and then effect movement of that member when theh delivery of fuel is required. Thus both of the proposed French constructions have all of the problems associated with the conventional fuel injection system, including manufacturing to close tolerances to obtain required sealing and the wear arising from high speed and high frequency operation.

In view of the relatively high costs of manufacture of known fuel injection systems they are currently not used on the more popular makes of motor vehicles in the high volume low cost category. However, in view of the increasing requirements for low pollution levels in exhaust gases, it would be desirable to incorporate fuel injections systems on all motor vehicles, provided this could be done at a reasonable cost.

SUMMARY OF THE INVENTION

It is therefore the principal object of the present invention to provide a method and apparatus for metering liquids, such as metering fuel to an internal combustion engine, which is effective in operation, does not require high precision manufacturing tolerances and finishes, and is therefore relatively inexpensive to manufacture.

With this object in view there is provided a method of delivering a metered quantity of liquid comprising filling a chamber with liquid, admitting gas to the chamber at a pressure sufficient to displace liquid from the chamber upon selective opening of a discharge port in the chamber, and controlling the quantity of liquid displaceable from the chamber by the admission of the gas to regulate the quantity of liquid delivered, the filling of the chamber with liquid, the admission of gas to the chamber, and the displacement of the liquid from the chamber being effected independently of any movement of the chamber.

In order to maintain accuracy and repeatability of the metered quantity of liquid displaced from the chamber it is important to ensure that the chamber is filled completely with the liquid prior to the admission of the gas. Furthermore, after the displacement of each metered quantity of liquid it is important that the chamber is purged of residual gas before the delivery of the next metered quantity of liquid.

Conveniently the liquid is circulated through the chamber so that all gas is expelled from the chamber prior to commencement of a delivery cycle, and when delivery of the liquid is required, circulation is terminated and the chamber is sealed filled with liquid.

More specifically there is provided a method of delivering a metered quantity of liquid comprising circulating liquid through a chamber to establish and maintain the chamber filled with liquid, terminating such circulation at intervals, admitting gas to the chamber during the termination of circulation at a pressure sufficient to displace liquid from the chamber upon selective opening of a discharge port in the chamber, and controlling the quantity of liquid displaceable from the chamber by the admission of the gas to regulate the quantity of liquid delivered.

The quantity of liquid displaceable by the admission of the gas may be controlled by varying the relative positions of the entry of the gas to the chamber and the discharge of the liquid from the chamber. It will be appreciated that when the gas is admitted to the chamber essentially only that liquid between the levels of the gas entry and the liquid discharge port will be displaced by the incoming gas and that liquid outside the space between the levels of gas entry and the liquid discharge is essentially not removed.

The admission of the gas to the chamber establishes an interface between the gas and the liquid over the cross-section of the chamber. This interface moves along the chamber from the point of gas entry towards the point of liquid discharge displacing the liquid in advance of the interface towards the liquid discharge. Upon the interface reaching a location whereby the liquid is no longer in direct communication with the discharge point further movement of the interface is prevented and thus the discharge of liquid ceases.

Alternatively the quantity of liquid discharged may be controlled by control of the volume of the chamber between the gas entry point and liquid discharge point and thus these points may remain fixed.

With the previously stated object in view there is also provided apparatus for delivering a metered quantity of liquid comprising a chamber having a selectively openable discharge port, means operable to supply liquid to the chamber to fill the chamber with the liquid preparatory to delivering, means operable to selectively admit gas to the chamber at a pressure sufficient to displace liquid therefrom upon opening of the discharge port, and means to control the quantity of liquid displaceable from the chamber by the admission thereto of the gas.

More specifically, the invention provides apparatus for delivering a metered quantity of liquid comprising a chamber having a selectively openable discharge port, means to circulate liquid through the chamber to maintain the chamber filled with liquid, means to terminate the circulation at intervals, means operable to admit gas to the chamber at a pressure sufficient to displace liquid therefrom during termination of said circulation and upon opening of the discharge valve, and means to control the quantity of liquid displaceable from the chamber by the admission of the gas.

Conveniently the liquid is pumped through a closed circuit incorporating the chamber, and inlet and outlet valves are provided to temporarily isolate the chamber from the closed circuit to terminate the circulation through the chamber. The inlet and outlet valves are located so that the chamber is maintained filled with liquid during circulation. Upon the inlet and outlet valves being closed they are maintained closed during the admission of the gas to the chamber until the displacement of liquid by the gas is completed.

Conveniently, the chamber is provided with ports for the gas to enter the chamber and the liquid to be discharged from the chamber, and one or both of the ports are relatively movable. The quantity of liquid displaceable from the chamber by the incoming gas may thus be controlled by movement of one or both of the ports towards one another to decrease the quantity displaceable from the chamber, and apart to increase the quantity.

The means to control the quantity of liquid displaceable from the chamber may be manually operated automatically by a preset programme responsive to selected conditions.

The advantages of this invention is the delivery of the liquid from the chamber by the admission of gas thereto rather than by movement of a piston or plunger which must carry a seal suitable to withstand the high pressure encountered. Such a seal must also withstand the high speed and high frequency of operation arising from one power stroke and one return stroke for each delivery. By the present invention the moving component is only required to move to effect variations in fuel demand which are small, infrequent and slow compared with the movement of a mechanical pump piston.

The invention will be more readily understood from the following description with reference to the accompanying drawings of a practical application of the method and a practical construction of the apparatus of the invention. The drawings and following description are not the only practical forms of the method and apparatus of the invention and are not limiting on the scope of the invention.

BRIEF DESCRIPTION OF THE INVENTION

In the drawings.

DETAILED DESCRIPTION OF THE INVENTION

In the following description with reference to the accompanying drawings the method and apparatus is considered to be applied to a fuel injection system for an internal combustion engine, however it will be appreciated that it is equally applicable to any type of liquid which is required to be delivered in metered quantities for any purpose.

Figure 1:
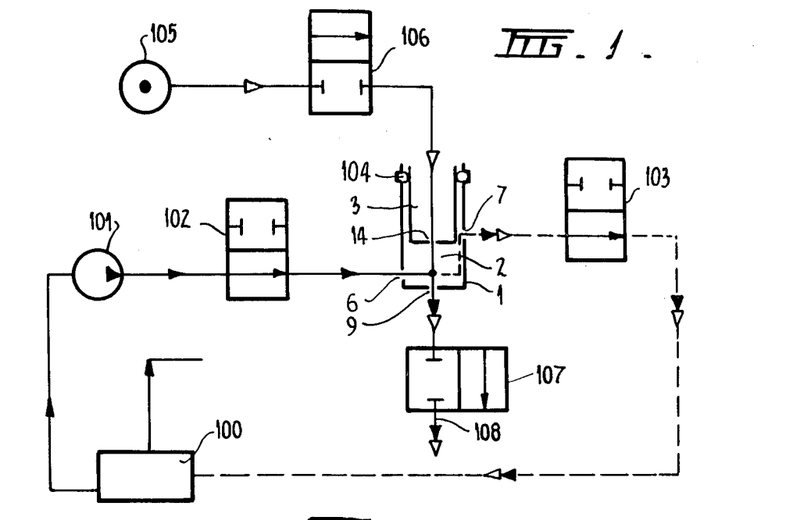
FIG. 1 is a schematic representation of one practical application of the method of delivering metered quantities of liquid.
Figure 2:
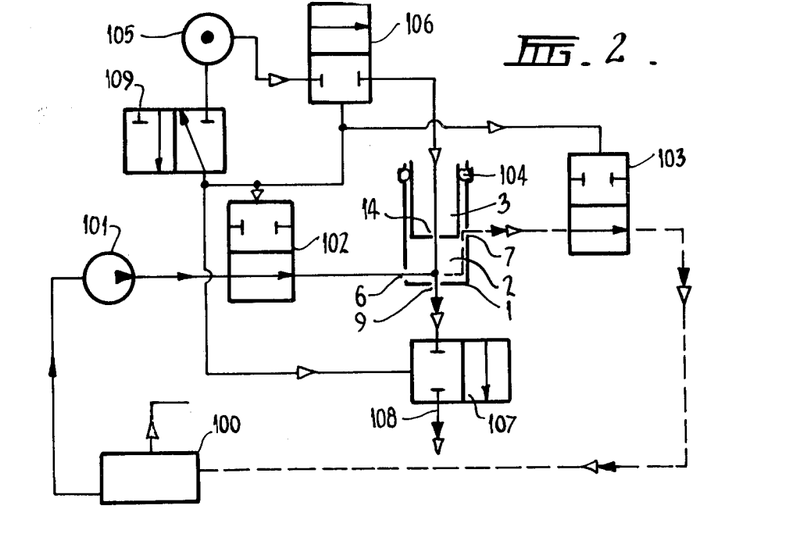
FIG. 2 is a schematic representation of the method illustrated in FIG. 1 with the addition of a practical arrangement for the controlling of the valves.

The various components of the system are shown in FIGS. 1 and 2 using B.S.I./I.S.O. fluid power symbols.

Referring now to FIG. 1 the metering chamber 2 is defined by a stationary member 1 and a movable member 3 which is a free fit in the bore of the stationary member 1. Fuel is drawn from the fuel tank 100 by the low pressure fuel pump 101 and delivered through valve means 102 to the metering chamber 2 at inlet port 6. When the chamber 2 is full, excess fuel flows from the metering chamber 2 through the clearance between movable member 3 and member 1, out through outlet port 7 and hence through valve means 103 to return to fuel tank 100. Preferably the seal 104 is located between movable member 3 and stationary member 1 to prevent leakage.

High pressure gas is stored in source 105 and is prevented from flowing into the metering chamber 2 by valve means 106 which is normally closed and gas port 14 in the movable member 3. Fuel is prevented from flowing from the metering chamber 2 via gas port 14 by the normally closed valve means 106. Similarly fuel is prevented from flowing out of metering chamber 2 through discharge port 9 by valve means 107 which is normally closed.

It will be understood that except during the delivery cycle the metering chamber 2 is maintained filled with fuel by the pump 101 with the amount of fuel contained in metering chamber 2 determined by the position of movable member 3 relative to fixed member 1.

To deliver a metered quantity of fuel from the chamber 2, valve means 102 and 103 are closed so that no further fuel can enter or leave metering chamber 2 via inlet and outlet ports 6 and 7 respectively. Valve means 106 and 107 are then opened so that high pressure gas from source 105 enters the metering chamber 2 through gas port 14, and displaces the metered quantity of fuel in the chamber 2 through discharge port 9 and open valve means 107 into line 108. Thus the metered quantity of fuel is injected into an appropriate part of the engine. Sufficient gas must be permitted to enter the metering chamber 2 to displace the metered quantiy of fuel, however the quantity of gas supplied may exceed this minimum and the excess gas is discharged through the discharge port 9 with the fuel.

To repeat the cycle, valve means 106 and 107 are closed and valve means 102 and 103 are opened so that residual gas in the metering chamber 2 is expelled through port 7 and valve 103 to the vented fuel tank 100, and fuel is again circulated through metering chamber 2 by the fuel pump 101 thus filling the chamber 2 with fuel. It is normal for the pump 101 to operate continuously while the injection device is in use.

The quantity of liquid delivered during each cycle is controlled by the position of the movable member 3 in the bore of the stationary member 1 as the gas inlet port 14 is located at the inner end the movable member 3 and the discharge port 9 at the opposite end of the chamber 2, and thus all the liquid in the chamber 2 will be displaced on the admission of the gas through the port 14.

However it is to be understood that if the discharge port 9 is located in the wall of chamber 2 spaced from the end of the chamber the quantity of liquid discharged through the port 9 is determined by volume of liquid in the chamber between the gas inlet port 14 and the discharge port 9. In both these arrangements the quantity of fuel delivered each cycle is controlled by the position of the movable member 3. It is also to be understood that the positions of the discharge port 9 and gas inlet port 14 may be interchanged whereby the discharge port 9 and gas inlet port 14 may be interchanged whereby the discharge port is disposed in the movable member 3 and the gas inlet port is disposed in the stationary member 1.

The valve means 102, 103, 106 and 107 described with reference to FIG. 1 may be actuated to change from the metering position to the delivery position by applying thereto a pneumatic signal transmitted from the control valve means 109 in timed relationship to the engine cycle, as indicated in FIG. 2. Upon activation of the control valve means 109 high pressure gas is applied to each of the valve means 102, 103, 106 and 107 to open valve means 106 and 107 and close valve means 102 and 103 to change their positions from the metering to the delivery positions. Upon return of control valve means 109 to its original position, the gas pressure in the control lines to valves 102, 103, 106 and 107 is vented and valve means 102 and 103 open while valve means 106 and 107 are closed.

It will be understood that some of the valve means referred to in the preceding description with respect to FIGS. 1 and 2 may be in the form of check valves.

One practical arrangement of the apparatus will now be described with reference to FIGS. 3, 4 and 5, in which components corresponding to those referred to with respect to FIGS. 1 and 2 are designated by the same reference numerals.

The apparatus comprises a body 1 having a metering cavity 2 formed generally centrally therein. Four independent ports co-operate with the metering cavity 2, namely fuel inlet port 6, fuel outlet port 7, gas port 14 and discharge port 9. The fuel inlet port 6 communicates with fuel passages 4 and 5 with passage 4 adapted at the face of the body 1 to be connected to a fuel supply, such as a low pressure pump delivering fuel from a storage tank. The fuel outlet port 7 communicates with the fuel passage 8, which is again adapted at the face of the body 1 for connection by a conduit to the fuel storage. Thus when the ports 6 and 7 are open, fuel may be circulated from the storage tank through the metering cavity 2, entering the cavity via the passages 4 and 5 and the port 6, and leaving the cavity by the port 7, and passage 8.

The fuel inlet port 6 and fuel outlet port 7 are controlled by respective valve elements 22 and 27 operated by identical control mechanisms. The valve elements 22 and 27 are connected to the ends of rods 21 and 26 respectively which at their opposite ends are connected to respective diaphragms 19 and 24. Respective springs 20 and 25 act through the associated diaphragms and rods to hold the valve elements 22 and 27 in an open position with respect to the ports 6 and 7. Fluid pressure may be applied to the diaphragms 19 and 24 through the passages 18 and 23 to oppose the action of the springs 20 and 25 respectively, so that the ports 6 and 7 are closed by the valve elements 22 and 27.

The discharge port 9 is normally closed by the ball valve 10 which is held in the closed position by the spring 13 acting through the rod 12. The diaphragm 30 is connected to the rod 12 so that the ball valve 10 may be moved to open the port 9 by the application of fluid pressure to the diaphragm 30 through the port 28.

The movable member 3 is screw threaded into the body 1 in a co-axial relation with the metering cavity 2. The movable member 3 has a tubular extension portion 37 which extends into the metering cavity 2 through an appropriate seal 41, and carries at its lower end the gas inlet port 14. The valve element 15 closes the gas port 14 under the action of the spring 17 transmitted to the valve element 15 through the rod 16 disposed co-axially in the extension 37. The diaphragm 36 is attached to the rod 16 so that the application of fluid pressure to the chamber 35, as hereinafter described, will raise the valve element 15 to open the port 14.

The chamber 35 communicates via the passages 34 with the chamber 33 which in turn communicates with the passage 32 adapted at 31 at the face of the body 1 for connection to a source of gas under high pressure. The gas port 14 communicates with the chamber 35 via the annular passage formed between the rod 16 and the extension 37 of the movable member 3.

Rotation of the movable member 3 in threaded engagement with the body 1 results in the lower end of the extension 37 moving axially in the metering chamber 2 to vary the capacity thereof and, at the same time, the position of the gas inlet port 14 in the metering chamber is varied, whereby the quantity of fuel delivered during each cycle is controlled.

The operation of the apparatus described above is as follows:

1. With the fuel inlet and fuel outlet ports 6 and 7 in the normally open condition, and the gas inlet port 14 and discharge port 9 in the normally closed position, fuel is circulated through the metering cavity to maintain it filled with fuel.

2. Pressure is applied to the diaphragms 19 and 24 respectively to close the fuel inlet and fuel outlet ports 6 and 7 which results in a quantity of fuel being isolated in the metering cavity 2, the quantity depending on the position of the extension 37 of the movable member 3 in the metering cavity 2.

3. Pressure is also applied to the diaphragms 36 and 30 so that the valve elements 15 and 10 are moved to open the ports 14 and 9 respectively. The opening of the port 14 admits the gas under pressure to the metering chamber 2 so that the liquid in the metering chamber is displced therefrom through the now open discharge port 9 and hence through the delivery passage 38. Thus the metered quantity of fuel in the metering chamber 2 is delivered to the appropriate part of the engine to which the passage 38 is connected.

4. The gas pressure is then relieved from the four diaphragms 19, 24, 36 and 30 so that the fuel inlet and outlet ports 6 and 7 are opened, and the gas port 14 and the discharge port 9 are closed by the actions of springs 20, 25, 17 and 13 respectively.

5. Fuel circulation through the metering chamber 2 is thus re-established, purging the gas therefrom and filling the chamber with fuel, thereby placing the apparatus in a condition for the next cycle.

The high pressure pulse of gas which issues from the port 14 impinging on the stationary liquid in the metering cavity 2, and the somewhat tortuous path through which both liquid and gas have to escape will result in a certain amount of break up of the liquid into small droplets. In addition when the mixture of gas and liquid are allowed to escape into the space into which injection is taking place, further atomization, i.e. the average droplet size of the spray produced, is determined by a number of factors such as the ration of gas to liquid in the spray, the pressure drop which occurs on injection and the geometry of the nozzle through which injection takes place. These can be varied over a wide range and are obvious to those skilled in the art.

As previously referred to the quantity of fuel displaced from the metering cavity 2 during each delivery operation is varied by adjusting the position of the movable member 3 within the body 1. Accordingly, by rotation of the movable member 3 the assembly comprising the port 14, the valve element 15, the rod 16, the chamber 35, diaphragm 36 and spring 17 are axially displaced as an integral unit. This axial displacement moves the extension portion 37 of the movable member carrying the gas inlet port towards or away from the delivery port 9 in the body 1 so as to vary the quantity of liquid which may be received in the metering cavity 2 between these two ports and hence vary the quantity of liquid which is metered for delivery during each delivery cycle.

It will be appreciated that in the embodiment illustrated only the seals 40 and 41 are subject to contact with moving components during the operation of the apparatus, however, the movements involved are only those necessary to effect variation in the metered quantity of fuel and are therefore relatively small and infrequent.

The adjustment of the movable member 3 or the equivalent component in other constructions of the metering apparatus may be effected by electrical or mechanical means or by fluid pressure. The sensing of the need for adjustment and the extent of the adjustment may be determined by suitable sensing devices responsive to load conditions on the engine, pressure conditions in the engine cylinder and/or manifold, or by direct operator control.

The pressure pulses required to activate the various valve elements and provide the gas under pressure to effect the injection may be supplied from an independent pump with or without an intermediate reservoir. The pump may operate at a pressure sufficiently high to meet the pressure requirements of the injector or may be a low pressure pump operating in conjunction with a pressure multiplier to give the required operating pressure. Alternatively, gas under pressure may be bled from the cylinder of the engine at a particular point and/or over a selected period in the working cycle of the engine to operate the valves and injector. Again, the pressure may be applied directly or through a pressure multiplier.

Figure 3:
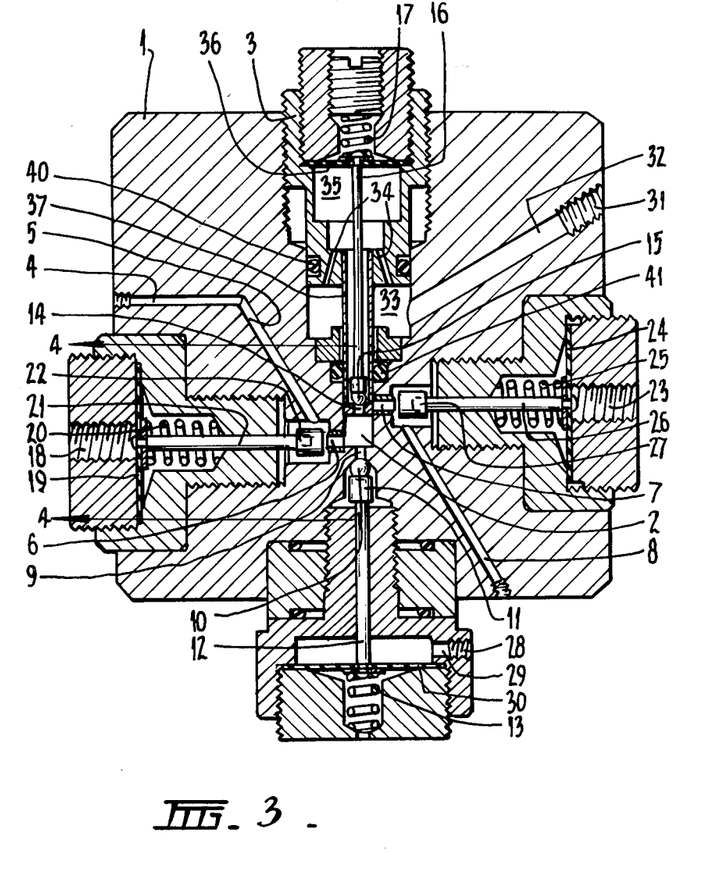
FIG. 3 is a sectional view of a practical arrangement of the apparatus for delivering metered quantities of liquid.
Figure 4:
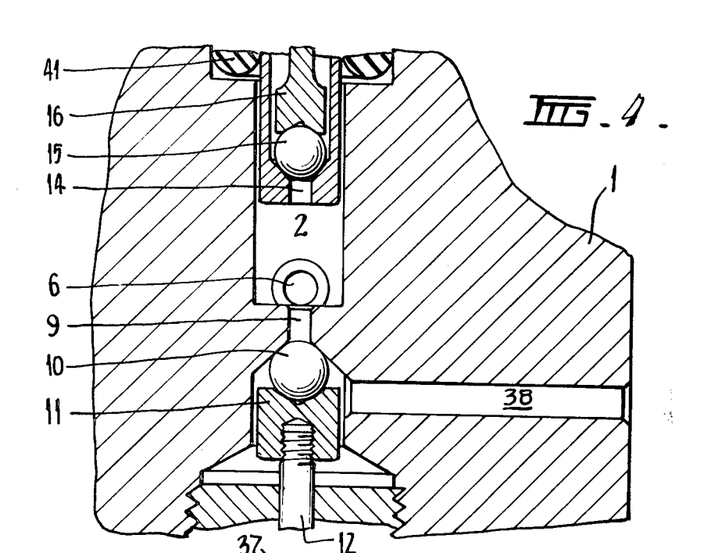
FIG. 4 is a fragmental section along line 4-4 in FIG. 3.
Figure 5:
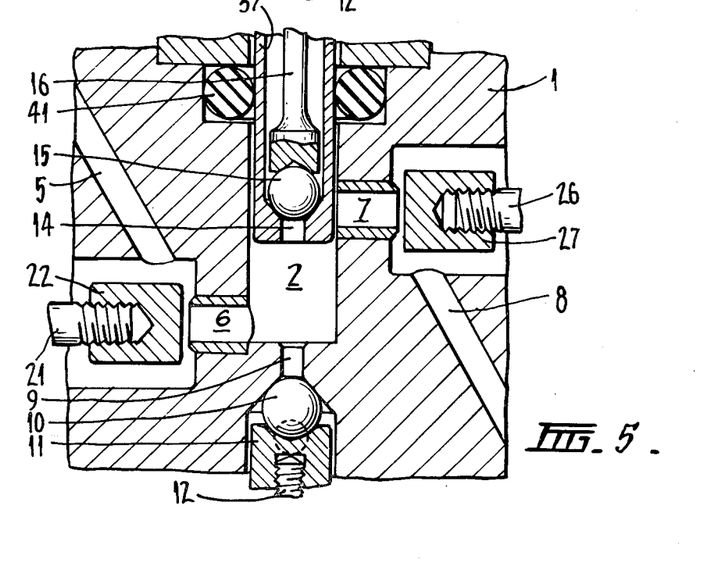
FIG. 5 is an enlarged view of the chamber portion of the apparatus shown in FIG. 3.

It will be understood that the disposition and manner of operating the valve elements in the injection device illustrated in FIGS. 3 to 5 may be varied without departing from the inventive concept, and thus the present invention is not limited to the particular disposition and mechanism shown. By way of example, the valve controlling admission of the gas under pressure to the metering cavity may be in the body 1 (stationary member), and the valve supplying the fuel to the injector in the movable member 3. By way of another example, it is also possible to place all ports and associated valves in fixed relationship to each other in the body (stationary member) and use the movable member purely to vary the volume of liquid displaceable from the metering cavity 2 by the admission of the gas thereto.

Figure 6:
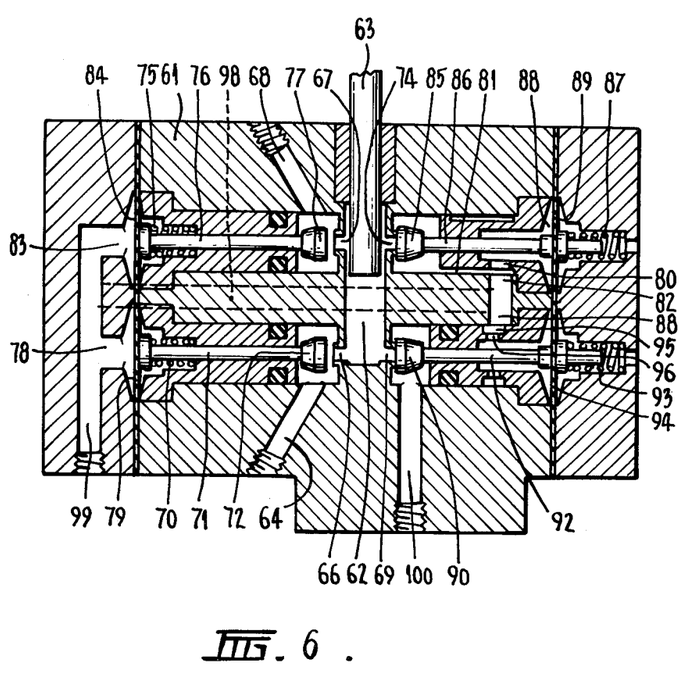
FIG. 6 is a sectional view of another practical arrangement of the apparatus for delivering metered quantities of liquid.

An arrangement in which all ports and associated valves are placed in fixed relationship to each other is shown in FIG. 6.

The apparatus comprises the body 61 having the metering cavity 62 formed generally centrally therein. The movable member 63 is axially slidable in the body 61 and extends into the metering cavity 62. Four independent ports communicate with the metering cavity 62, namely fuel inlet port 66, fuel outlet port 67, gas port 74 and discharge port 69. The fuel inlet port 66 also communicates with fuel passage 64, the passage 64 being adapted at the face of the body 61 to be connected to a fuel supply, such as a low pressure pump delivering fuel from a storage tank. The fuel outlet port 67 communicates with the fuel passage 68, which is again adapted at the face of the body 61 for connection by a conduit to the fuel storage. Thus when the ports 66 and 67 are open, fuel may be circulated from the storage tank through the metering cavity 62, entering the cavity via the passage 64 and the port 66, and leaving the cavity by the port 67, and passage 68.

The fuel inlet port 66 and fuel outlet port 67 are controlled by respective valve elements 72 and 77 operated by identical control mechanisms. The valve elements 72 and 77 are connected to the ends of rods 71 and 76 respectively, which at the opposite ends are connected to respective diaphragms 79 and 84. Respective springs 70 and 75 act through the associated diaphragms 79, 84 and rods 71, 76 to hold the valve elements 72 and 77 in an open position with respect to the ports 66 and 67. Fluid pressure may be applied to the diaphragms 79 and 84 through the passages 78 and 83 to oppose the action of the springs 70 and 75 respectively, so that the ports 66 and 67 are closed by the valve elements 72 and 77.

The discharge port 69 is normally closed by valve element 90 which is held in the closed position by the spring 93 acting through the rod 92. The diaphragm 94 is connected to the rod 92 so that valve element 90 may be moved to open the port 69 by the application of fluid pressure to the diaphragm 94 through the port 88, annular groove 95 and port 96.

Gas port 74 is normally closed by valve element 85 under the action of the spring 87 transmitted to the valve element 85 through the rod 86. The diaphragm 89 is attached to the rod 86 so that the application of fluid pressure to the chamber 88, as hereinafter described, will raise the valve element 85 to open the port 74.

The chamber 88 communicates via the passage 80 with annulus 81 which in turn communicated with the passage 82. Passages 82 and 88 both connect via passage 98, which is out of the plane of the section shown, with passage 99 which is adapted at the face of the body 61 for connection to a source of gas at high pressure. The gas port 74 communicates with passage 82 via the annular passage 81.

The operation of the apparatus described above is as follows:

1. With fuel inlet and fuel outlet ports 66 and 67 in the normally open condition, and the gas inlet port 74 and discharge port 69 in the normally closed position, fuel is circulated through the metering cavity to maintain it filled with fuel.

2. Pressure is applied to the diaphragms 79 and 84 respectively to close the fuel inlet and outlet ports 66 and 77 which results in a quantity of fuel being isolated in the metering cavity 62, the quantity depending on the position of the movable member 63 in the metering cavity 62.

3. Pressure is also applied to the diaphragms 94 and 89 so that the valve elements 85 and 90 are moved to open the ports 74 and 69 respectively. The opening of the port 74 admits the gas under pressure to the metering chamber 62 via the annulus between moving member 63 and fixed member 61 so that the liquid in the metering chamber is displaced therefrom through the now open discharge port 69 and hence through the delivery passage 100. Thus the metered quantity of fuel in the metering chamber 62 is delivered to the appropriate part of the engine to which the passage 100 is connected.

4. The gas pressure is then relieved from the four diaphragms 79, 84, 89 and 94 so that the fuel inlet and outlet ports 66 and 67 are opened, and the gas port 74 and the discharge port 69 are closed by the actions of springs 70, 75, 87 and 93 respectively.

5. Fuel circulation through the metering chamber 62 is thus re-established, purging the gas therefrom and filling the chamber with fuel, thereby placing the apparatus in a condition for the next cycle.

It is to be understood that, subject to the manufacturing technique used, seal means may be incorporated between the body 61 and the movable member 63. Also the desposition of the respective ports may be varied, and other constructions of valve mechanisms used.

The statement previously made in regard to the embodiment illustrated in FIGS. 3 to 5 and relating to means to effect movement of the movable member 3 apply equally to the effecting of movement of the movable member 63 in the embodiment shown in FIG. 6. Similarly the previous statements regarding the source of the pressure pulses to operate the valve mechanisms are applicable to the embodiment shown in FIG. 6.

We claim:

1. Apparatus for delivering a metered quantity of fuel to an engine comprising:

a body having a chamber formed therein, a fuel inlet port communicating with said chamber, a first valve means in association with said fuel inlet port for permitting fuel to flow through said fuel inlet port into said chamber, a fuel outlet port communicating with said chamber, a second valve means in association with said fuel outlet port for permitting the discharge of fuel from said chamber when the chamber is filled with fuel between said fuel inlet port and said fuel outlet port, said first valve means and said second valve means cooperating when opened so that fuel completely fills said chamber between said fuel inlet port and said fuel outlet port with any residual gas being displaced from at least that portion of said chamber, a gas inlet port communicating with said chamber, a third valve means associated with said gas inlet port for permitting gas to flow through said port into said chamber, a fuel discharge port communicating with said chamber, a fourth valve means in association with said discharge port for permitting discharge of fuel from said chamber, said third valve means and said fourth valve means cooperating when opened and when said first and second valve means are closed so that upon opening of the third valve means gas passes through said gas inlet port into said chamber and displaces fuel between said gas inlet port and said fuel discharge port from said chamber through said fuel discharge port, the opening and closing of said valve means being independent of any movement of said chamber, control means for controlling the amount of fuel displaced from the chamber, upon a given cycle of gas injection into said chamber, by adjusting the relative positions of the gas inlet port and the fuel discharge port to vary the capacity of the chamber thereinbetween to thereby control the amount of fuel discharged from the apparatus in a given cycle.

2. A method of delivering a metered quantity of fuel for delivery to an engine, said method comprising circulating fuel through a chamber fitted with a gas inlet port and a fuel discharge port until the portion of the chamber lying between said ports is filled with fuel, terminating the circulation of fuel and admitting gas to said chamber through said gas inlet port at a pressure sufficient to displace fuel from the chamber, displacing fuel from the chamber by the admitted gas upon the selective opening of said fuel discharge port, with the opening and closing of the ports being independent of any movement of said chamber, and controlling the quantity of fuel displaceable in a given cycle of gas admission to said chamber by adjusting the relative positions of the gas inlet port and the fuel discharge port to vary the capacity of the chamber thereinbetween to thereby control the amount of fuel discharged from the apparatus in a given cycle.

3. A method of delivering a metered quantity of fuel for delivering to an engine; said method comprising:
  filling a chamber with fuel;
  admitting gas to said chamber at a pressure sufficient to displace the fuel from the chamber;
  displacing the fuel from the chamber by the admitted gas upon selective opening of a discharge port in communication with said chamber; and
  controlling the quantity of fuel displaceable by the admission of said gas to the chamber by adjusting the relative positions of the entry of the gas to and of the discharge of the fuel from said chamber, whereby the fuel capacity of the chamber between said positions is varied.

4. A method according to claim 3 wherein the quantity of fuel is controlled by moving the position of entry of said gas to the chamber.

5. A method according to claim 3 or 4, including forming on admission of the gas to the chamber a gas/fuel interface across the chamber at the position of admission of the gas so the volume of fuel discharged from the cylinder is the volume between the gas/fuel interface and the discharge port.

6. A method according to any one of claims 3 or 4 wherein said filling of said chamber with fuel, said admission of gas to said chamber and said displacement of fuel from said chamber is effected independently of any movement of said chamber.

7. A method according to any one of claims 3 or 4, including circulating fuel through the chamber to fill the chamber, terminating said circulation at intervals, and admitting the gas to the chamber while said circulation is terminated.

8. Apparatus capable of use for delivering a metered quantity of fuel to an engine, comprising:
  a body having a chamber formed therein,
  inlet means selectively openable to the chamber to admit fuel or gas to the chamber,
  a discharge port means selectively openable to the chamber whereby, on opening of said inlet means to admit gas to the chamber and opening of the fuel discharge port means, fuel is displaced from the chamber by the gas,
  and adjustment means to adjust the relative positions of the admission of the gas to the chamber and discharge of fuel from the chamber, to vary the capacity of the chamber therebetween, and thereby control the quantity of fuel displaceable from the chamber through the discharge port means by the admission of the gas.

9. Apparatus as claimed in claim 8, wherein said inlet means includes separate fuel inlet means for admitting fuel to said chamber and gas inlet means for admitting gas to said chamber.

10. Apparatus as claimed in claim 8 wherein said adjustment means adjusts the position of the gas inlet means.

11. Apparatus for delivering a metered quantity of fuel to an engine comprising:
  a first member having a chamber formed therein;
  a discharge port communicating with said chamber;
  discharge port means which can be opened and closed for controlling the flow of fuel through said discharge port;
  means to admit fuel to the chamber to fill said chamber when said discharge port means is closed;
  a gas inlet port communicating with said chamber;
  means operable to selectively admit gas to said chamber through said gas inlet port to displace fuel from the chamber upon opening of the discharge port means; and
  means to adjust the relative positions of the gas inlet port and the discharge port to vary the volume of the chamber between said gas inlet and discharge ports and thereby control the quantity of fuel displaceable from the chamber through the discharge port by the admission of the gas.

12. Apparatus according to claim 9 or 10 including a movable member extending into the chamber and movable relative to the chamber, the gas inlet means being formed in said movable member.

13. Apparatus as claimed in any one of claims 9 or 10, including selectively openable fuel inlet and outlet ports communicating with the chamber to permit circulation of fuel through the chamber.

14. Apparatus according to claim 12, wherein said movable member includes an end means within the chamber and containing said gas inlet means, said end means for forming a gas/fuel interface upon admission of gas to the chamber at said end means, the volume of fuel discharged from said chamber being the volume of fuel between said gas/fuel interface and said discharge means.

15. Apparatus as claimed in claim 12, wherein said means cooperate so that said filling of the chamber with fuel, said admission of the gas to said chamber and said displacement of fuel from said chamber are effected independently of movement of said chamber.

16. Apparatus according to claim 12 wherein the gas inlet means is formed in the end face of the movable member within the chamber.

17. Apparatus as claimed in claim 12, wherein the movable member is movable relative to the chamber in the direction of the displacement of the fuel from the chamber.

18. Apparatus as claimed in claim 12, including means to control the extent of projection of the movable member into the chamber.

19. Apparatus as claimed in claim 14, including means to control the extent of projection of the movable member into the chamber.

20. Apparatus as claimed in claim 14, including selectively openable fuel inlet and outlet ports communicating with the chamber to permit circulation of fuel through the chamber.

21. Apparatus as claimed in claim 14, wherein said means cooperate so that said filling of the chamber with fuel, said admission of the gas to said chamber and said displacement of fuel from said chamber are effected independently of movement of said chamber.

22. Apparatus as claimed in claim 16, wherein said means cooperate so that said filling of the chamber with fuel, said admission of the gas to said chamber and said displacement of fuel from said chamber are effected independently of movement of said chamber.

23. Apparatus as claimed in claim 17, including means to control the extent of projection of the movable member into the chamber.

24. Apparatus as claimed in claim 17, wherein said means cooperate so that said filling of the chamber with fuel, said admission of the gas to said chamber and said displacement of fuel from said chamber are effected independently of movement of said chamber.

25. Apparatus as claimed in claim 18, wherein said means cooperate so that said filling of the chamber with fuel, said admission of the gas to said chamber and said displacement of fuel from said chamber are effected independently of movement of said chamber.

26. Apparatus as claimed in claim 11, including a second member having the gas inlet port therein disposed so the gas is admitted to the chamber therethrough, said member being movable relative to the chamber to adjust the position of the gas inlet port relative to the discharge port.

27. Apparatus as claimed in any one of claims 11, 26 or 29, including means to circulate fuel through said chamber to fill said chamber with fuel, and means to terminate at intervals said circulation of fuel, said means to admit gas to said chamber being operable during termination of said circulation.

28. Apparatus as claimed in any one of claims 11, 26 or 29, wherein the first member is provided with a fuel inlet port and a fuel outlet port communicating with said chamber, and respective valve means are provided to selectively open and close said fuel inlet and outlet ports.

29. Apparatus as claimed in claim 26, including means to control the position of said second member relative to the chamber to thereby adjust the position of the gas inlet port relative to the discharge port.

30. Apparatus as claimed in claim 28, including control means to actuate each said valve means, said control means being arranged to actuate the valve means so that the fuel inlet and outlet ports are closed when said gas inlet and discharge ports are open.

31. Apparatus as claimed in any one of claims 11, 10, 8, 26 or 29, wherein the said means cooperate so that the said filling of the chamber with fuel, said admission of the gas to said chamber and said displacement of fuel from said chamber are effected independently of movement of said chamber.

32. Apparatus for delivering a metered quantity of fuel to an engine comprising:
a body having a chamber formed therein,
a fuel inlet port communicating with said chamber,
a first valve means in association with said fuel inlet port for permitting fuel to flow through said fuel inlet port into said chamber,
a fuel outlet port communicating with said chamber,
a second valve means in association with said fuel outlet port for permitting the discharge of fuel from said chamber when the chamber is filled with fuel between said fuel inlet port and said fuel outlet port, said first valve means and said second valve means cooperating when opened so that fuel completely fills said chamber between said fuel inlet port and said fuel outlet port with any residual gas being displaced from at least that portion of said chamber,
a gas inlet port communicating with said chamber,
a third valve means associated with said gas inlet port for permitting gas to flow through said port into said chamber,
a fuel discharge port communicating with said chamber,
a fourth valve means in association with said discharge port for permitting discharge of fuel from said chamber, said third valve means and said fourth valve means cooperating when opened and when said first and second valve means are closed so that upon opening of the third valve means gas passes through said gas inlet port into said chamber and displaces that fuel between said gas inlet port and said fuel discharge port from said chamber through said fuel discharge port,
the opening and closing of said valve means being independent of any movement of said chamber,
control means for controlling the amount of fuel displaced from the chamber upon a given cycle of gas injection into said chamber, said control means extending into said chamber between said gas inlet port and said fuel discharge port and being movable relative to at least one of said ports in a predetermined direction for varying the volume of the chamber between said gas inlet port and said fuel discharge port to thereby control the amount of fuel discharged from the apparatus in a given cycle.

33. Apparatus of claim 32, wherein said first valve means and said second valve means are associated with a fuel reservoir, first and second conduits connecting the first and second valves to said fuel reservoir, respectively, so that when said chamber is filled with fuel by the opening of the said first valve means excess fuel recycles through said second valve means and the second conduit to said fuel reservoir, and from said fuel reservoir through said first conduit and first valve means back to said chamber.

34. Apparatus of claim 33, wherein said first and second valve means completely fill with fuel at least that portion of said chamber extending thereinbetween, and that portion of the chamber extending between said third valve means and said fourth valve means.

35. Apparatus for delivering a metered quantity of fuel to an internal combustion engine, said apparatus comprising:
a body having a chamber formed therein,
openable and closable fuel inlet port means for selectively admitting fuel to said chamber, openable and closable fuel outlet port means for selectively discharging fuel from said chamber when that first portion of the chamber between said fuel inlet port means and said outlet port means is filled with fuel,
openable and closable gas inlet port means for selectively admitting gas to said chamber,
openable and closable fuel discharge port means for selectively discharging fuel from said chamber upon closing of said fuel inlet and outlet port means and opening of said gas inlet port means and said fuel discharge port means, said fuel discharge port means being at a position displaced from said gas inlet port means to define thereinbetween a second portion of the chamber, said first portion of the chamber and said second portion of the chamber both being completely filled with fuel just prior to the opening of the gas inlet port means to admit gas into said chamber, and means for adjusting the volume of said second portion to control the quantity of fuel displaceable from the chamber by said gas in a given cycle.

36. Apparatus of claim 35, wherein volume of the chamber between the gas inlet port means and the final discharge port means is reduced by reducing the length of the fluid path between said gas inlet port means and the fuel discharge port means.

37. Apparatus as claimed in claim 35, including a member extending into the chamber and movable relative to the chamber in the direction of displacement of the fuel from the chamber to vary the volume of the chamber between the positions of entry of the gas to and of discharge of the fuel from the chamber.

38. In an internal combustion engine power system including an internal combustion engine, a fuel supply and apparatus for delivering fuel from said supply to said engine, the improvement comprising said fuel delivery apparatus including means for delivering a metered quantity of fuel to said engine comprising:

a member having a chamber formed therein;

filling means for filling said chamber with fuel;

a selectively openable fuel discharge port means communicating with said chamber for discharging fuel and/or gas from said chamber;

a selectively openable gas inlet port means communicating with said chamber and spaced in a predetermined direction from said discharge port means for admitting gas to said chamber;

said fuel discharge port means and said gas inlet port means cooperating when opened and gas is admitted to said chamber to displace by said gas that fuel filling the chamber between said gas inlet port means and said fuel discharge port means; and a movable member means extending into said chamber between the gas inlet port means and fuel discharge port means and movable relative to the chamber in the predetermined direction for adjusting the position of the movable member within the chamber between the gas inlet port means and the fuel discharge port means to thereby vary the volume of the chamber between the gas inlet port means and the fuel discharge port means and thus vary the volume of fuel displaced in a given gas admission cycle.

39. Apparatus as claimed in claim 38, wherein the movable member means extends into said chamber from one end thereof past the gas inlet port means so that the end of the movable member means within the chamber is located between the gas inlet and fuel discharge port means.

40. Apparatus as claimed in claim 38 or 39 including means operable to admit fuel to said chamber to fill said chamber with fuel when said discharge port means and gas inlet port means are closed.

41. Apparatus as claimed in claim 38 or 39 including means to control the movement of said movable member means to regulate the quantity of fuel displaceable from said chamber by the admission of the gas thereto.

42. Apparatus as claimed in claim 38 or 39, wherein said filling of the chamber with fuel, said admission of the gas to the chamber and said displacement of the fuel from said chamber are effected independently of movement of said chamber.

43. In an internal combustion engine power system including an internal combustion engine, a fuel supply and fuel delivery apparatus for delivering fuel from said supply to said engine, the improvement comprising said fuel delivery apparatus including means for delivering a metered quantity of fuel to said engine comprising:

a body having a chamber formed therein, a fuel inlet port communicating with said chamber, a first valve means in association with said fuel inlet port for permitting fuel to flow through said fuel inlet port into said chamber, a fuel outlet port communicating with said chamber, a second valve means in association with said fuel outlet port for permitting the discharge of fuel from said chamber when the chamber is filled with fuel between said fuel inlet port and said fuel outlet port, said first valve means and said second valve means cooperating when opened so that fuel completely fills said chamber between said fuel inlet port and said fuel outlet port with any residual gas being displaced from at least that portion of said chamber, and a gas inlet port communicating with said chamber, a third valve means associated with said gas inlet port for permitting gas to flow through said port into said chamber, a fuel discharge port communicating with said chamber, a fourth valve means in association with said discharge port for permitting discharge of fuel from said chamber, said third valve means and said fourth valve means cooperating when opened and when said first and second valve means are closed so that upon opening of the third valve means gas passes through said gas inlet port into said chamber and displaces fuel between said gas inlet port and said fuel discharge port from said chamber through said fuel discharge port, the opening and closing of said valve means being independent of any movement of said chamber, control means for controlling the amount of fuel displaced from the chamber, upon a given cycle of gas injection into said chamber, by adjusting the relative positions of the gas inlet port and the fuel discharge port to vary the capacity of the chamber thereinbetween to thereby control the amount of fuel discharged from the apparatus in a given cycle.

44. In an internal combustion engine power system including an internal combustion engine, a fuel supply and apparatus for delivering fuel from said supply to said engine, the improvement comprising said fuel delivery apparatus including means for delivering a metered quantity of fuel to said engine comprising:

a body having a chamber formed therein, inlet means selectively openable to the chamber to admit fuel or gas to the chamber, a discharge port means selectively openable to the chamber, whereby, on opening of said inlet means to admit gas to the chamber and opening of the discharge port means, fuel is displaced from the chamber by the gas, and adjustment means to adjust the relative positions of the admission of the gas to the chamber and discharge of fuel from the chamber, to vary the capacity of the chamber therebetween, and thereby control the quantity of fuel displaceable from the chamber through the discharge port by the admission of the gas.

45. In an internal combustion engine power system including an internal combustion engine, a fuel supply and apparatus for delivering fuel from said supply to said engine, the improvement comprising said fuel delivery apparatus including means for delivering a metered quantity of fuel to said engine comprising:

a first member having a chamber formed therein;

a discharge port communicating with said chamber;

discharge port means which can be opened and closed for controlling the flow of fuel through said discharge port;

means to admit fuel to the chamber to fill said chamber when said discharge port means is closed;

a gas inlet port communicating with said chamber;

means operable to selectively admit gas to said chamber through said gas inlet port to displace fuel from the chamber upon opening of the discharge port means; and means to adjust the relative positions of the gas inlet port and the discharge port to vary the volume of the chamber between said gas inlet and discharge ports and thereby control the quantity of fuel displaceable from the chamber through the discharge port by the admission of the gas.

46. In an internal combustion engine power system including an internal combustion engine, a fuel supply and apparatus for delivering fuel from said supply to said engine, the improvement comprising said fuel delivery apparatus including means for delivering a metered quantity of fuel to said engine comprising:

a body having a chamber formed therein, a fuel inlet port communicating with said chamber, a first valve means in association with said fuel inlet port for permitting fuel to flow through said fuel inlet port into said chamber, a fuel outlet port communicating with said chamber, a second valve means in association with said fuel outlet port for permitting the discharge of fuel from said chamber when the chamber is filled with fuel between said fuel inlet port and said fuel outlet port, said first valve means and said second valve means cooperating when opened so that fuel completely fills said chamber between said fuel inlet port and said fuel outlet port with any residual gas being displaced from at least that portion of said chamber, and a gas inlet port communicating with said chamber, a third valve means associated with said gas inlet port for permitting gas to flow through said port into said chamber, a fuel discharge port communicating with said chamber, a fourth valve means in association with said discharge port for permitting discharge of fuel from said chamber, said third valve means and said fourth valve means cooperating when opened and when said first and second valve means are closed so that upon opening of the third valve means gas passes through said gas inlet port into said chamber and displaces that fuel between said gas inlet port and said fuel discharge port from said chamber through said fuel discharge port, the opening and closing of said valve means being independent of any movement of said chamber, control means for controlling the amount of fuel displaced from the chamber upon a given cycle of gas injection into said chamber, said control means extending into said chamber between said gas inlet port and said fuel discharge port and being movable relative to at least one of said ports in a predetermined direction for varying the volume of the chamber between said gas inlet port and said fuel discharge port to thereby control the amount of fuel discharged from the apparatus in a given cycle.

47. In an internal combustion engine power system including an internal combustion engine, a fuel supply and apparatus for delivering fuel from said supply to said engine, the improvement comprising said fuel delivery apparatus including means for delivering a metered quantity of fuel to said engine comprising:

a body having a chamber formed therein, openable and closable fuel inlet port means for selectively admitting fuel to said chamber, openable and closable fuel outlet port means for selectively discharging fuel from said chamber when a first portion of the chamber between said fuel inlet port means and said outlet port means is filled with fuel, openable and closable gas inlet port means for selectively admitting gas to said chamber, openable and closable fuel discharge port means for selectively discharging fuel from said chamber upon closing of said fuel inlet and outlet ports means and opening of said gas inlet port means and said fuel discharge port means, said fuel discharge port means being at a position displaced from said gas inlet port means to define a second portion of the chamber thereinbetween, said first portion of the chamber and said second portion of the chamber both being completely filled with fuel just prior to the opening of the gas inlet port means to admit gas into said chamber, and means for adjusting the volume of said second portion to control the quantity of fuel displaceable from the chamber by said said gas in a given cycle.

48. Engine power system of any one of claims 38, 43, 44 or 45, wherein said engine power system is located in a vehicle.

49. Apparatus as claimed in claim 40 wherein the means to admit the fuel comprise selectively operable fuel inlet and fuel outlet ports provided in said chamber; and means to circulate fuel through said chamber when the fuel inlet and outlet ports are open to thereby fill the chamber with fuel.

50. Apparatus as claimed in claim 40, wherein said filling of the chamber with fuel, said admission of the gas to the chamber and said displacement of the fuel from said chamber are effected independently of movement of said chamber.

51. Apparatus as claimed in claim 41, wherein said filling of the chamber with fuel, said admission of the gas to the chamber and said displacement of the fuel from said chamber are effected independently of movement of said chamber.

52. Apparatus as claimed in claim 49, wherein the fuel inlet and fuel outlet ports are spaced apart in the said predetermined direction.

53. Apparatus as claimed in claim 49, wherein said filling of the chamber with fuel, said admission of the gas to the chamber and said displacement of the fuel from said chamber are effected independently of movement of said chamber.

54. Apparatus as claimed in claim 52, wherein the fuel discharge port means and fuel inlet port are located at or near one end of the chamber; and the gas inlet port means and fuel outlet port are located at or near the opposite end of the chamber.

55. Apparatus as claimed in claim 52, wherein said filling of the chamber with fuel, said admission of the gas to the chamber and said displacement of the fuel from said chamber are effected independently of movement of said chamber.

56. Apparatus as claimed in claim 54, wherein said filling of the chamber with fuel, said admission of the gas to the chamber and said displacement of the fuel from said chamber are effected independently of movement of said chamber.

57. Apparatus as claimed in claim 8, wherein said adjustment means varies the capacity of the chamber, and said chamber is filled with fuel immediately prior to fuel displacement, so as to control said quantity of displaceable fuel.

58. Apparatus as claimed in claim 13, including means operable to selectively open said gas inlet means to admit gas to said chamber and close said fuel inlet and outlet ports when the gas inlet means is open.

59. Apparatus as claimed in claim 13, wherein said filling of the chamber with fuel, said admission of the gas to said chamber and said displacement of fuel from said chamber are effected independently of movement of said chamber.

60. Apparatus as claimed in claim 58, wherein said means cooperate so that said filling of the chamber with fuel, said admission of the gas to said chamber and said displacement of fuel from said chamber are effected independently of movement of said chamber.

* * * * *